US012655791B1

(12) United States Patent
Gut et al.

(10) Patent No.: US 12,655,791 B1
(45) Date of Patent: Jun. 16, 2026

(54) SYSTEM AND METHOD FOR MASS FLOW CONTROL OF AN EXHAUST GAS RECIRCULATION SYSTEM OF A GAS TURBINE

(71) Applicant: GE Vernova Infrastructure Technology LLC, Greenville, SC (US)

(72) Inventors: Jean-Marie François Marc Gut, Klosters (CH); Aysegul Kirecci, Baden (CH); Gregory Hespe, Baden (CH); Prashant Sharma, Uttar Pradesh (IN); Ralph Mayer, Oak Island, NC (US); Harvey Kent Dunning, Cromwell, CT (US); Balaji Narayanan, Bangalore (IN)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/275,931

(22) Filed: Jul. 21, 2025

(51) Int. Cl.
F02C 3/34 (2006.01)
F02C 9/16 (2006.01)
F02C 9/20 (2006.01)

(52) U.S. Cl.
CPC ................. F02C 3/34 (2013.01); F02C 9/16 (2013.01); F02C 9/20 (2013.01); F05D 2270/08 (2013.01)

(58) Field of Classification Search
CPC ...... F02C 3/34; F02C 9/16; F02C 9/20; F05D 2270/08
See application file for complete search history.

(56) References Cited

U.S. PATENT DOCUMENTS

| | | | | | |
|---|---|---|---|---|---|
| 10,012,151 | B2 * | 7/2018 | Thatcher | ................... | F02C 9/20 |
| 12,129,818 | B1 * | 10/2024 | Dunn | ..................... | F02M 26/30 |
| 2011/0289898 | A1 * | 12/2011 | Hellat | ..................... | F01K 23/10 |
| | | | | | 60/39.23 |
| 2011/0289899 | A1 * | 12/2011 | De La Cruz Garcia | .. | F02C 3/28 |
| | | | | | 60/39.38 |
| 2011/0302922 | A1 * | 12/2011 | Li | ............................ | F02C 3/34 |
| | | | | | 60/645 |
| 2012/0186268 | A1 * | 7/2012 | Rofka | ........................ | F02C 3/34 |
| | | | | | 60/39.182 |
| 2012/0240590 | A1 * | 9/2012 | Hellat | ..................... | F02C 3/30 |
| | | | | | 416/223 R |
| 2012/0291445 | A1 * | 11/2012 | Rofka | ........................ | F02C 3/13 |
| | | | | | 60/39.182 |

(Continued)

*Primary Examiner* — William H Rodriguez
(74) *Attorney, Agent, or Firm* — Fletcher Yoder, P.C.

(57) ABSTRACT

Systems and methods are provided for controlling the mass flow of an exhaust gas to be delivered from an EGR system to a gas turbine system in a power plant. The mass flow control is provided through a mass flow controller including 1) a primary mass flow control that modulates the mass flow of the EGR flow by adjusting operating conditions of an EGR blower, 2) a secondary mass flow control that maintain power optimized operation of the EGR blower by adjusting the position of an EGR outlet damper, and 3) a tertiary flow modulation control that limits the EGR operation within mechanical design boundaries of the EGR duct by throttling the position of an EGR inlet damper. As such, the presently disclosed embodiments may operate independently to provide precise mass flow control within the EGR system, optimize power consumption of the blower, and safeguard the EGR system within its design boundaries.

20 Claims, 3 Drawing Sheets

(56) References Cited

U.S. PATENT DOCUMENTS

| | | | | |
|---|---|---|---|---|
| 2013/0047576 A1* | 2/2013 | Sander | F02C 3/34 | |
| | | | 60/39.182 | |
| 2013/0086883 A1* | 4/2013 | Sander | F02C 3/34 | |
| | | | 60/39.52 | |
| 2013/0174535 A1* | 7/2013 | Van Straaten | F02C 9/18 | |
| | | | 60/269 | |
| 2014/0290264 A1* | 10/2014 | Hovel | F01K 23/10 | |
| | | | 60/772 | |
| 2014/0318146 A1* | 10/2014 | Kobayashi | F02C 6/08 | |
| | | | 429/444 | |
| 2014/0360199 A1* | 12/2014 | Hellat | F02C 3/06 | |
| | | | 60/39.48 | |
| 2014/0360200 A1* | 12/2014 | Benz | F01K 23/101 | |
| | | | 60/39.182 | |
| 2015/0000293 A1* | 1/2015 | Thatcher | F02C 3/30 | |
| | | | 60/39.52 | |
| 2015/0000294 A1* | 1/2015 | Minto | F01D 17/02 | |
| | | | 60/39.52 | |
| 2015/0226133 A1* | 8/2015 | Minto | F02C 9/48 | |
| | | | 60/39.27 | |
| 2015/0308293 A1* | 10/2015 | Huntington | F02C 9/28 | |
| | | | 60/39.5 | |
| 2015/0377146 A1* | 12/2015 | Della-Fera | F02C 1/08 | |
| | | | 60/39.52 | |

* cited by examiner

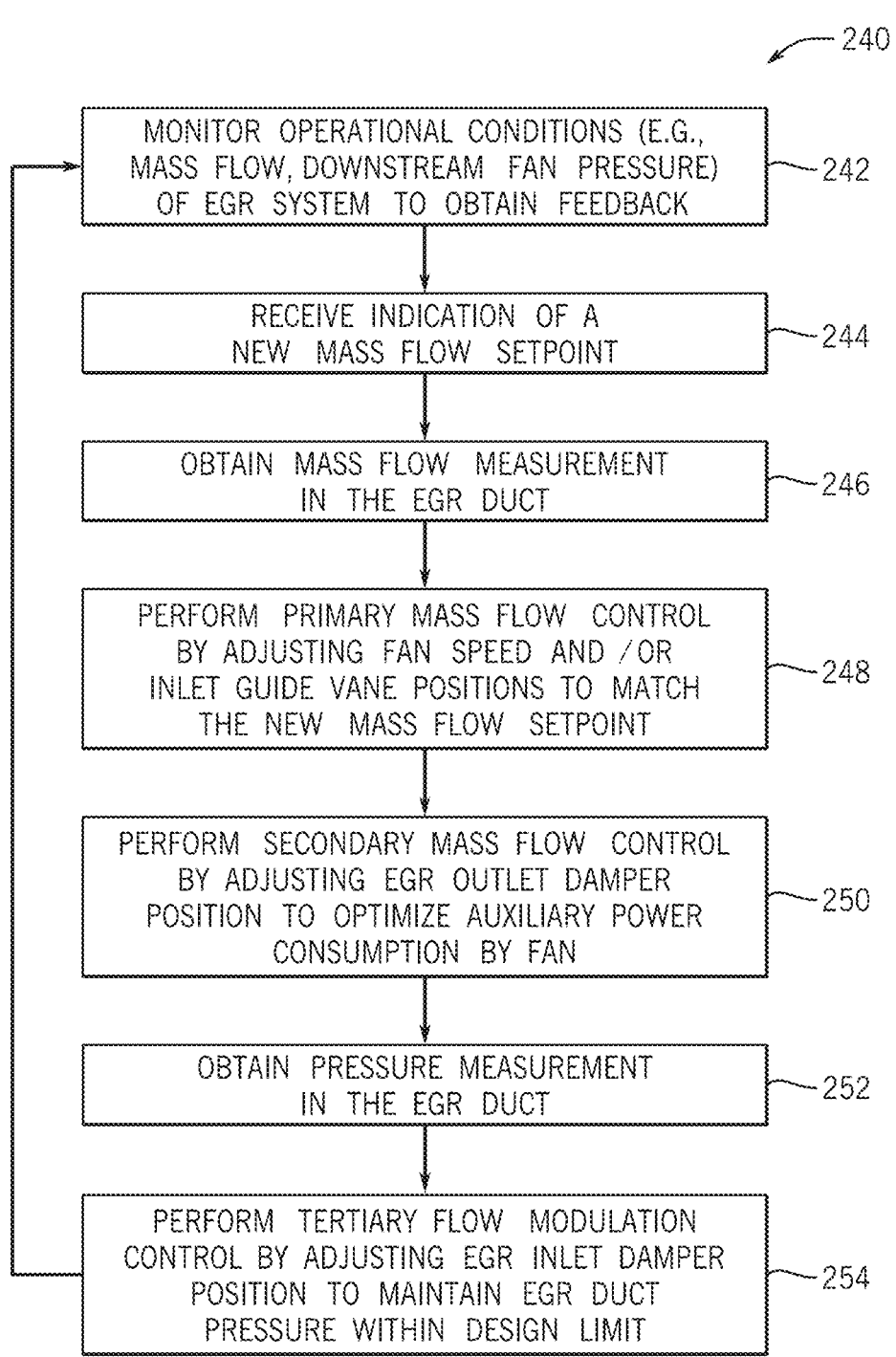

240

MONITOR OPERATIONAL CONDITIONS (E.G.,
MASS FLOW, DOWNSTREAM FAN PRESSURE)
OF EGR SYSTEM TO OBTAIN FEEDBACK
— 242

RECEIVE INDICATION OF A
NEW MASS FLOW SETPOINT
— 244

OBTAIN MASS FLOW MEASUREMENT
IN THE EGR DUCT
— 246

PERFORM PRIMARY MASS FLOW CONTROL
BY ADJUSTING FAN SPEED AND / OR
INLET GUIDE VANE POSITIONS TO MATCH
THE NEW MASS FLOW SETPOINT
— 248

PERFORM SECONDARY MASS FLOW CONTROL
BY ADJUSTING EGR OUTLET DAMPER
POSITION TO OPTIMIZE AUXILIARY POWER
CONSUMPTION BY FAN
— 250

OBTAIN PRESSURE MEASUREMENT
IN THE EGR DUCT
— 252

PERFORM TERTIARY FLOW MODULATION
CONTROL BY ADJUSTING EGR INLET DAMPER
POSITION TO MAINTAIN EGR DUCT
PRESSURE WITHIN DESIGN LIMIT
— 254

FIG. 3

SYSTEM AND METHOD FOR MASS FLOW CONTROL OF AN EXHAUST GAS RECIRCULATION SYSTEM OF A GAS TURBINE

TECHNICAL FIELD

The present disclosure is directed to gas turbine engines used for electrical power generation and, more specifically, to a system and method for mass flow control of an exhaust gas recirculation system of such a gas turbine engine to reduce emissions.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial plant, such as a combustion-driven power plant, may produce a variety of gases, such as an exhaust gas of a combustion system. The combustion system may include a gas turbine engine, a reciprocating piston-cylinder engine, a furnace, a boiler, or other industrial equipment. These exhaust gases may include one or more undesirable gases, such as acid gases and/or greenhouse gases. For example, the undesirable gases may include carbon oxides ($CO_x$) such as carbon dioxide ($CO_2$) and carbon monoxide (CO), nitrogen oxides ($NO_x$) such as nitrogen dioxide ($NO_2$) and nitric oxide (NO), and/or sulfur oxides ($SO_x$) such as sulfur dioxide ($SO_2$). Specifically, $NO_x$ are considered acid gases, and they may react with water in the atmosphere and form acids such as nitric acid ($HNO_3$) and nitrous acid ($HNO_2$). These acids may contribute to acid rain, which can have detrimental effects on ecosystems, making $NO_x$ a significant environmental concern. While $NO_x$ are not typically considered to be greenhouse gases, they may indirectly contribute to the greenhouse effect. For example, through various atmospheric reactions, $NO_x$ may lead to the production of nitrous oxide ($N_2O$), which is a potent greenhouse gas with a global warming potential much greater than that of $CO_2$ over a 100-year period. As a further example, $NO_x$ may contribute to the formation of ground-level ozone, which is a harmful air pollutant and a key component of smog.

With various regulations and environmental concerns of public well-being and global warming, it would be desirable to reduce the output of undesirable gases (e.g., $NO_x$) into the atmosphere, particularly for hydrocarbon fuel consuming equipment such as combustion systems used in gas turbine engines designed for electrical power generation. Moreover, in systems having exhaust gas recirculation capabilities to reduce emissions, it would be useful to efficiently control operation of the exhaust gas recirculation components (e.g., dampers, blowers, and guide vanes of blowers) to ensure the desired mass flow, while minimizing the power required for these components.

SUMMARY

Certain embodiments commensurate in scope with the originally claimed subject matter are summarized below.

These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes a gas turbine system having a compressor, a combustor, and a turbine, wherein the gas turbine system is configured to combust a fuel and output an exhaust gas. The system further includes an exhaust gas recirculation (EGR) system coupled to the gas turbine system. The EGR system includes an EGR circuit, an EGR inlet damper coupled to the EGR circuit, an EGR outlet damper coupled to the EGR circuit, and an EGR blower coupled to the EGR circuit between the EGR inlet damper and the EGR outlet damper. The system further includes a controller having a processor, a memory, and instructions stored on the memory and executable by the processor to perform: receiving a first indication to increase a mass flow rate of the exhaust gas through the EGR circuit to the gas turbine system from a first mass flow rate to a second mass flow rate. The controller is further configured to perform: controlling, via a first control, the EGR blower in response to the first indication to increase the mass flow rate from the first mass flow rate to the second mass flow rate. The controller is further configured to perform: controlling, via a second control, the EGR outlet damper and the EGR blower to decrease a power consumption of the EGR blower while substantially maintaining the mass flow rate at the second mass flow rate.

In certain embodiments, a system includes a controller having a processor, a memory, and instructions stored on the memory and executable by the processor to perform: receiving a first indication to increase a mass flow rate of an exhaust gas through an exhaust gas recirculation (EGR) circuit of an EGR system coupled to a gas turbine system from a first mass flow rate to a second mass flow rate, wherein the gas turbine system includes a compressor, a combustor, and a turbine, wherein the gas turbine system is configured to combust a fuel and output the exhaust gas. The controller is further configured to perform: controlling, via a first control, an EGR blower of the EGR circuit in response to the first indication to increase the mass flow rate from the first mass flow rate to the second mass flow rate. The controller is further configured to perform: controlling, via a second control, an EGR outlet damper and the EGR blower of the EGR circuit to decrease a power consumption of the EGR blower while substantially maintaining the mass flow rate at the second mass flow rate.

In certain embodiments, a method of controlling a mass flow of an exhaust gas to be delivered from an exhaust gas recirculation (EGR) system to a gas turbine system includes: receiving, via a controller, a first indication to increase a mass flow rate of the exhaust gas through an EGR circuit of the EGR system coupled to the gas turbine system from a first mass flow rate to a second mass flow rate, wherein the gas turbine system includes a compressor, a combustor, and a turbine, wherein the gas turbine system is configured to combust a fuel and output the exhaust gas. The method further includes controlling, via a first control of the controller, an EGR blower of the EGR circuit in response to the first indication to increase the mass flow rate from the first mass flow rate to the second mass flow rate. The method further includes controlling, via a second control of the controller, an EGR outlet damper and the EGR blower of the EGR circuit to decrease a power consumption of the EGR blower while substantially maintaining the mass flow rate at the second mass flow rate.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present system and method will become better understood when the following detailed description is read with reference to the accompanying drawings in which like characters represent like parts throughout the drawings, wherein:

FIG. 3 is a process flow diagram illustrating a method for control of the EGR system of FIGS. 1 and 2, including control of the mass flow of the EGR flow into the intake of the gas turbine system.

DETAILED DESCRIPTION

Figure 1:
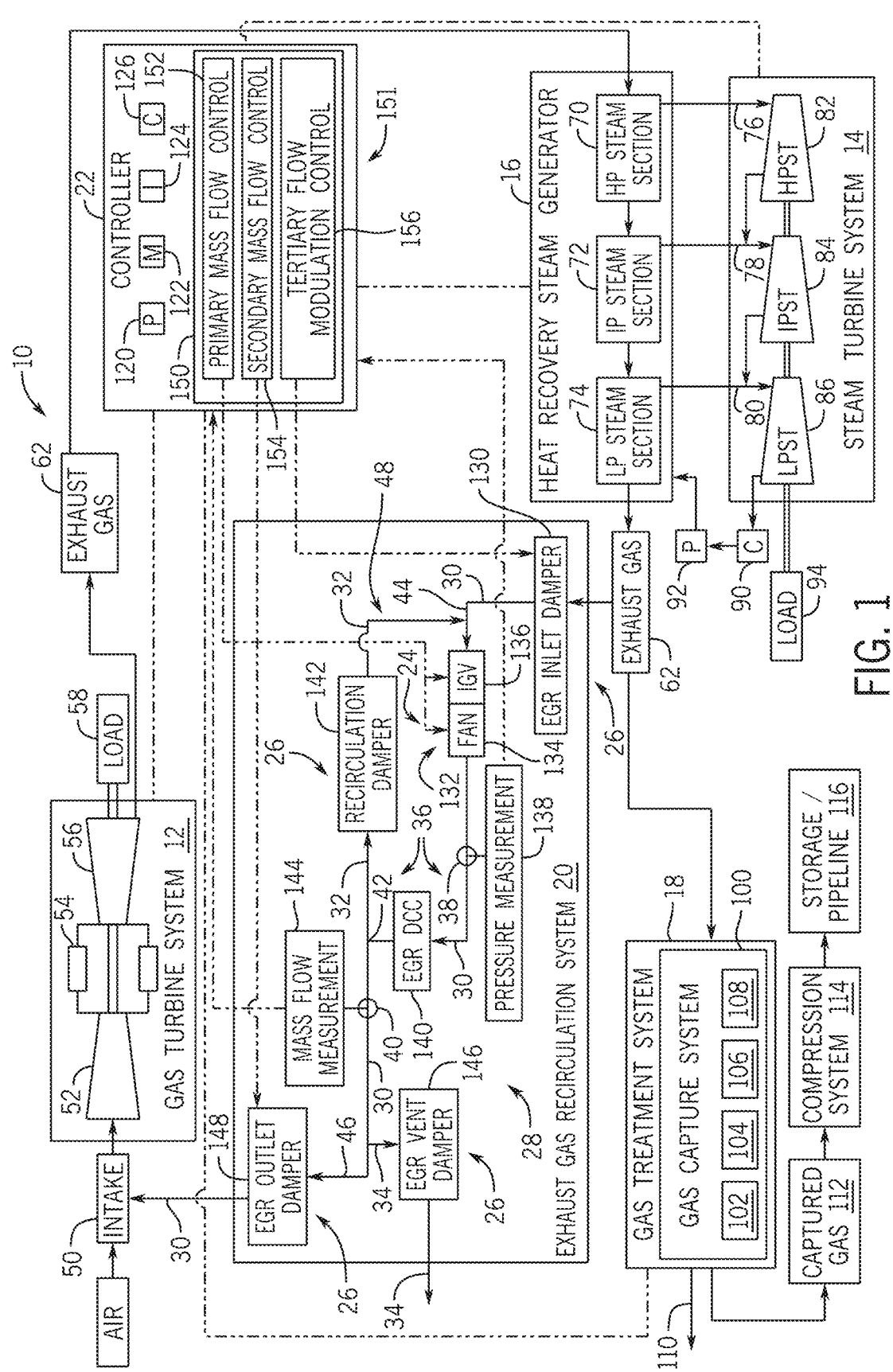
FIG. 1 is a block diagram of an embodiment of a power plant in a combined cycle configuration having an exhaust gas recirculation (EGR) system.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Combustion of hydrocarbon fuels, such as natural gas, at high temperatures results in the formation of NOx emissions in the exhaust gases from the gas turbine engine. While higher firing temperatures of the combustion system can increase power output from the gas turbine engine, such elevated temperatures contribute proportionally to the production of nitrous oxides (NOx) (i.e., higher temperatures lead to higher levels of NOx). Additionally, combustion of hydrocarbon fuels produces carbon dioxide ($CO_2$), which is a known greenhouse gas. Exhaust Gas Recirculation (EGR) is a technique aiming at increasing the concentration of $CO_2$ in an exhaust flow to reduce the size of the gas treatment system required for its separation and sequestration. An EGR system recirculates a portion of exhaust gases into an intake of a combustion system (e.g., air intake of a gas turbine system) to lower combustion temperatures and, ultimately, reduce the amount of NOx that is formed in the combustion system. Thus, EGR systems may contribute to cleaner air and enhanced engine performance, making them a key component in addressing environmental and regulatory challenges.

However, much of the understanding of the EGR systems is still evolving. This disclosure relates generally to systems and methods for controlling mass flow of an exhaust gas to be delivered from an EGR system to a gas turbine system in a power plant. As described herein, mass flow is the mass of a fluid (e.g., exhaust gas) that passes through a given point per unit of time, and may be expressed in units such as kilograms per second (i.e., kg/s). In contrast to other EGR flow control methods, the presently disclosed embodiments provide mass flow control for the EGR system through a mass flow controller including multiple levels of control. More specifically, the presently disclosed mass flow controller may include 1) a primary mass flow control that modulates the mass flow of the EGR flow by adjusting operating conditions of an EGR blower for a rapid (e.g., substantially real-time) adjustment of the mass flow; 2) a secondary mass flow control that maintains power optimized operation of the EGR blower by adjusting the position of an EGR outlet damper; and 3) a tertiary flow modulation control that limits the EGR system pressure within mechanical design boundaries of the EGR duct by throttling the position of an EGR inlet damper. As such, the presently disclosed embodiments may operate independently to 1) provide precise mass flow control within the EGR system; 2) optimize power consumption of the blower; and 3) safeguard the EGR system within its design boundaries. Accordingly, the disclosed embodiments may improve control and operation of industrial plants and enhance performance (e.g., reduce auxiliary power consumption), while achieving desired combustion operability requirements (e.g., maintaining minimum oxygen requirements).

With the foregoing in mind, FIG. 1 is a block diagram of an embodiment of a power plant 10 in a combined cycle configuration having a gas turbine system 12, a steam turbine system 14, a heat recovery steam generator (HRSG) 16, a gas treatment system 18, an exhaust gas recirculation (EGR) system 20, and a controller 22 coupled to each of the systems 12, 14, 16, 18, and 20. As discussed below, the EGR system 20 is configured to recirculate an exhaust gas 62 with a variable flow at least partially controlled via one or more blowers 24 (e.g., EGR blower 132) and one or more dampers 26 (e.g., EGR inlet damper 130, EGR recirculation damper 142, EGR vent damper 146, and EGR outlet damper 148) in an EGR circuit 28. For example, the EGR circuit 28 may include an EGR main flow path 30, an EGR return flow path 32, and an EGR vent flow path 34.

The EGR circuit 28 also includes a plurality of sensors 36, such as one or more pressure sensors 38 and one or more mass flow sensors 40. In operation, the controller 22 is configured to provide mass flow control for the EGR system 20 by controlling the one or more blowers and dampers through a mass flow controller 150 (e.g., closed loop EGR mass flow controller) including multiple levels of control 151 (e.g., primary mass flow control 152, secondary mass flow control 154, tertiary flow modulation control 156) in response to a load on the gas turbine system 12, thereby helping to address changes in load while reducing auxiliary power consumption by the blowers (e.g., EGR blower 132). Various aspects of the EGR system 20 and the associated mass flow controller 150 of the controller 22 are discussed in further detail below.

Before discussing details of the EGR system 20, various aspects of the combined cycle system 10 are discussed in further detail. The gas turbine system 12 includes an air intake 50, a compressor 52 having one or more compressor stages, one or more combustors 54, a turbine 56 (e.g., an expansion turbine) having one or more turbine stages, and a load 58 (e.g., electrical generator) driven by the turbine 56. The gas turbine system 12 further includes an exhaust gas recirculation (EGR) system 20 configured to recirculate an exhaust gas 62 (e.g., EGR flow) into the air intake 50 (e.g., air intake section, duct, and/or filter housing). The recirculated exhaust gas 62 helps to reduce volume flow and the formation of certain emissions (e.g., nitrogen oxides ($NO_X$)) associated with combustion in the combustors 54. In operation, the compressor 52 receives air (and also exhaust gas 62 when the EGR system 20 is active) from the air intake 50 and compresses the air (or air and exhaust gas 62 when the EGR system 20 is active) in one or more compressor stages (e.g., stages of rotating compressor blades). The combustors 54 then combust fuel from a fuel supply system with the compressed air and (optional) exhaust gas 62 and generate hot combustion gases. The hot combustion gases expand and drive one or more turbine stages (e.g., stages of rotating turbine blades) in the turbine 56, thereby driving rotation of the compressor 52 and the load 58 via one or more shafts. The turbine 56 then outputs the hot combustion gases as the exhaust gas 62.

The HRSG 16 recovers waste heat from the exhaust gas 62 to generate steam for driving the steam turbine system 14. The HRSG 16 may include a high-pressure (HP) steam section 70, an intermediate-pressure (IP) steam section 72, and a low-pressure (LP) steam section 74 configured to generate HP steam 76, IP steam 78, and LP steam 80. The steam turbine system 14 may include an HP steam turbine 82 driven by the HP steam 76, an IP steam turbine 84 driven by the IP steam 78, and a LP steam turbine 86 driven by the LP steam 80. In addition to the steam provided by the HRSG 16, the HP steam turbine 82 provides IP steam to the IP steam turbine 84, and the IP steam turbine 84 provides LP steam to the LP steam turbine 86. The LP steam turbine 86 then outputs to a condenser 90 configured to condense exhaust steam to form a condensate, and a pump 92 downstream of the condenser 90 is configured to pump the condensate back to the HRSG 16.

In operation, the steam turbine system 14 drives a load 94 (e.g., electrical generator) via a shaft. In certain embodiments, the steam turbine system 14 and/or the HRSG 16 may provide heated water and/or steam (e.g., HP steam 76, IP steam 78, and/or LP steam 80) to the gas treatment system 18 to support a desorption mode of the one or more gas capture systems 100. For example, the gas capture systems 100 may receive heated water and/or steam in a temperature range of 100 to 150 degrees Celsius, 110 to 150 degrees Celsius, 120 to 150 degrees Celsius, or 130 to 150 degrees Celsius.

After the HRSG 16, the exhaust gas 62 may flow to the gas treatment system 18 and/or the EGR system 20. In the illustrated embodiment, the exhaust gas 62 flows through one or more gas capture systems 100 of the gas treatment system 18 configured to capture undesirable gases. The undesirable gases may include carbon oxides ($CO_X$) (e.g., carbon dioxide ($CO_2$) and carbon monoxide (CO)), nitrogen oxides ($NO_X$) (e.g., nitrogen dioxide ($NO_2$) and nitric oxide (NO)), sulfur oxides ($SO_X$) (e.g., sulfur dioxide ($SO_2$)), or any combination thereof. In the following discussion, $CO_2$ may be used as an example of the undesirable gases; however, the gas capture systems 100 may be designed to capture any of the foregoing undesirable gases. For example, the gas capture systems 100 include one or more carbon capture systems (e.g., $CO_2$ capture systems). The gas capture systems 100 (e.g., carbon capture systems) may include sorbent-based gas capture systems, solvent-based gas capture systems, cryogenic gas capture systems, or any combination thereof, configured to remove and capture undesirable gases. The gas capture system 100 may include components 102, 104, 106, and 108 configured to enable gas capture of undesirable gases (e.g., $CO_2$) from the exhaust gas 62, thereby outputting a treated gas 110 and a captured gas 112 (e.g., $CO_2$). The treated gas 110 may be substantially free of the undesirable gases (e.g., $CO_2$) and may be discharged through an exhaust stack. The captured gas 112 (e.g., $CO_2$) may be compressed by a compression system 114 and stored and/or transported by a storage and/or pipeline system 116.

In certain embodiments, the carbon capture system 100 is a sorbent-based carbon capture system, and the components 102, 104, 106, and/or 108 include multiple sorbent-based carbon capture units (e.g., adsorbers). For example, the sorbent-based carbon capture units may include temperature swing adsorption (TSA) units or adsorbers, wherein a temperature swing or change is used to sequentially operate in an adsorption mode, a desorption mode, and a cooling mode at different temperatures. In the adsorption mode, the adsorber is configured to adsorb undesirable gases (e.g., $CO_2$) into sorbent material at a first temperature. In the desorption mode, the adsorber is configured to desorb the undesirable gases (e.g., $CO_2$) from the sorbent material, for example, by heating the sorbent material from the first temperature to a higher second temperature using a heat source to release the trapped gases. The heat source may include a heated fluid, such as a heated gas and/or liquid (e.g., steam). In the cooling mode, the adsorber is cooled in preparation for the next adsorption mode.

In certain embodiments, the carbon capture system 100 is a solvent-based carbon capture system, and the components 102, 104, 106, and/or 108 include one or more absorbers, strippers, and associated equipment. For example, the absorber is configured to absorb undesirable gases (e.g., $CO_2$) into a solvent, thereby outputting the treated gas 110 through an exhaust stack and a $CO_2$-rich solvent to the stripper. The stripper is configured to apply heat to the $CO_2$-rich solvent, thereby stripping the undesirable gases (e.g., $CO_2$) from the solvent to produce the captured gas 112 and a $CO_2$-lean solvent. The stripper may receive heat via a heat source, such as a heated gas and/or liquid (e.g., steam). The stripper returns the $CO_2$-lean solvent to the absorber to repeat the cycle.

In the illustrated embodiment, the controller 22 is configured to control all aspects of the combined cycle system 10. The controller 22 includes one or more processors 120, memory 122, instructions 124 stored on the memory 122 and executable by the processor 120, and communication circuitry 126 configured to communicate with sensors and various equipment of the combined cycle system 10. For example, the controller 22 is configured to receive sensor feedback from sensors coupled to the gas turbine system 12, the steam turbine system 14, the HRSG 16, the gas treatment system 18, and the EGR system 20, and to control the same equipment based on the sensor feedback, operating modes, user input, computer models, or any combination thereof. The sensors may include temperature sensors, pressure sensors, flow rate sensors, gas composition sensors, or any combination thereof. In certain embodiments, the controller 22 is configured to control operation of the gas treatment system 18 (e.g., gas capture systems 100), such by controlling modes of operation (e.g., adsorption mode, desorption mode, and cooling mode), controlling heat sources for supplying heated fluid (e.g., steam) to the gas capture systems 100, controlling cooling sources for supply cooled fluids to the gas capture systems 100, or any combination thereof. In the illustrated embodiment, the controller 22 (e.g., mass flow controller 150) is configured to control operation of the EGR system 20 via the primary mass flow control 152, the secondary mass flow control 154, and tertiary flow modulation control 156, which includes control of various dampers and blowers as described in further detail below.

In the illustrated embodiment, the EGR system 20 includes the one or more blowers 24 (e.g., EGR blower 132), the dampers 26 (e.g., EGR inlet damper 130, EGR outlet damper 148, recirculation damper 142), the sensors 36 (e.g., pressure sensors 38 and mass flow sensors 40), and an EGR cooler 140 in the EGR circuit 28. In particular, the EGR circuit 28 includes the EGR inlet damper 130, the EGR blower 132, the pressure sensor 38, the EGR cooler 140, the mass flow sensor 40, and the EGR outlet damper 148 along the EGR main flow path 30 to the air intake 50 of gas turbine system 12. The EGR circuit 28 includes the EGR recirculation damper 142 along the EGR return flow path 32 from a downstream position 42 between the EGR cooler 140 and the EGR outlet damper 148 to an upstream position 44 relative to the EGR blower 132 along the EGR main flow path 30. The EGR circuit 28 includes the EGR vent damper 146 along the EGR vent flow path 34 from a downstream position 46 between the EGR cooler 140 and the EGR outlet damper 148 along the EGR main flow path 30, wherein the EGR vent flow path 34 is configured to vent or purge the exhaust gas 62 to the atmosphere. The EGR circuit 28 (e.g., flow paths 30, 32, and 34) includes various fluid ducts or conduits, valves, fittings, and manifolds, in addition to the components noted above.

In operation, after the HRSG 16, the portion of the exhaust gas 62 flowing into the EGR system 20 is regulated by the EGR inlet damper 130. The other dampers 26 (e.g., EGR recirculation damper 142, EGR vent damper 146, and EGR outlet damper 148) also regulate the flow through the EGR circuit 28 as discussed in further detail below. Each of the dampers 26 (e.g., 130, 142, 146, and 148) includes an actuator drivingly coupled to a blade assembly, wherein the actuator is commanded and controlled by the controller 22. The actuator may include an electric actuator, a pneumatic actuator, or a hydraulic actuator. The blade assembly of the dampers 26 may include one or more blades (e.g., flaps, louvers, blades, or plates) that generally move or rotate between open and closed positions and any intermediate position in response to the actuator commanded position. For example, each damper 26 may include one or more blades coupled to a hinge, linkage or pivot joint. In certain embodiments, each damper 26 may have a single blade or a plurality of blades, each configured to rotate about a respective hinge or pivot joint.

Additionally, each damper 26 may be actuated by its actuator to move either in a stepwise control scheme (e.g., stepwise positioning mode) or a non-stepwise control scheme (e.g., rate limited schedule) along the range of movement between the fully opened position and the fully closed position, wherein the stepwise control scheme moves the damper between a plurality of discrete positions, and the non-stepwise control scheme moves the damper at a rate (e.g., linear or curved profile) along the range of movement. For the stepwise control scheme, the steps may correspond to angular steps or increments for angular implementation of the blade assembly (e.g., rotating blade) of the damper 26.

For an angular implementation of the dampers 26, the actuator is configured to move the blades to different positions (e.g., angles) within a range of movement between a fully closed position (e.g., angular position of) 0° and a fully opened position (e.g., angular position of) 90° relative to a plane perpendicular to a flow path, thereby adjusting the mass flow rate and pressure of exhaust gas 62 flowing through the damper 26.

The exhaust gas 62 may be further regulated as it flows through the EGR blower 132, which may include a fan 134 with a variable speed drive and one or more inlet guide vanes (IGVs) 136. The fan 134 may include an electric motor coupled to a blade set (e.g., a plurality of fan blades coupled to a fan hub). In certain embodiments, the EGR blower 132 may include a plurality of fans 134. The IGVs 136 include a plurality of guide vanes coupled to an actuator (e.g., electric, pneumatic, or hydraulic actuator), which adjusts the plurality of guide vanes (e.g., adjustable angle) to adjust the flow path angle entering the fan (e.g., duct or housing of the EGR blower 132). The IGVs 136 may include a plurality of radial vanes configured to rotate about radial axes, or the IGVs 136 may include a plurality of parallel vanes configured to rotate about parallel axes, to open and close the exhaust flow path. The IGVs 136 may be directly coupled to the fan 134 at the inlet of the fan 134, or the IGVs 136 may be offset at a distance (e.g., 3, 6, 9, or 12 inches) upstream from the fan 134. In certain embodiments, the EGR blower 132 may adjust the mass flow rate and the pressure of the exhaust gas 62 by adjusting the fan speed and/or the IGV position to ensure exhaust gas recirculation power consumption efficiency. A first sensor 36 (e.g., pressure sensor 38) may be disposed downstream of the EGR blower 132 to measure the flow characteristics (e.g., pressure measurement 138) of the modulated exhaust gas 62 exiting the EGR blower 132.

In the illustrated embodiment, the EGR system 20 includes the EGR cooler 140 (e.g., direct contact cooler (DCC) or fluid spray cooler) configured to cool and scrub (e.g., water wash) the exhaust gas 62 prior to recirculation to the air intake 50. However, the EGR cooler 140 may include any suitable direct contact cooler (DCC) (e.g., fluid spray cooler) or indirect cooler or heat exchanger. In the illustrated embodiment, the EGR cooler 140 (e.g., DCC) may be configured to directly contact and cool the exhaust gas 62 with a cooling fluid (e.g., water) sprayed and/or evaporated into the exhaust gas 62. The EGR cooler 140 also may include a cooling system to help lower a temperature of the cooling fluid. Additionally, a second sensor 36 (e.g., mass flow sensor 40) may be disposed downstream from the EGR cooler 140 to measure the flow characteristics (e.g., mass flow rate 144) of the portion of the exhaust gas 62 supplied by the EGR system 20 to the air intake 50 via the EGR outlet damper 148.

The dampers 26 (e.g., 130, 142, 146, and 148) are controlled by the controller 22 (e.g., mass flow controller 150) to control the flow of exhaust gas 62 along various flow paths through the EGR circuit 28. For example, the controller 22 is configured to selectively open (e.g., variable degrees of opening) the EGR inlet damper 130 to control the flow of exhaust gas 62 through the EGR circuit 28 relative to a flow of exhaust gas 62 through the gas treatment system 18. For example, the controller 22 is configured to selectively close the EGR inlet damper 130 to block all of the flow of exhaust gas 62 through the EGR circuit 28, or completely open the EGR inlet damper 130 for a maximum flow of the exhaust gas 62 through the EGR circuit 28. Similarly, the controller 22 is configured to selectively open (e.g., variable degrees of opening) the EGR outlet damper 148 to control the flow of exhaust gas 62 through the EGR circuit 28 along the EGR main flow path 30 to the air intake 50 of the gas turbine system 12. For example, the controller 22 is configured to selectively close the EGR outlet damper 148 to block all of the flow of exhaust gas 62 through the EGR main flow path 30 to the air intake 50, or completely open the EGR outlet damper 148 for a maximum flow of the exhaust gas 62 through the EGR main flow path 30 to the air intake 50.

The controller 22 also may selectively control the EGR recirculation damper 142 and the EGR vent damper 146 to control the mass flow rate and/or the pressure of the exhaust gas 62 flowing through the EGR circuit 28. In certain embodiments, the controller 22 is configured to selectively open (e.g., variable degrees of opening) the EGR recirculation damper 142 to control the flow of exhaust gas 62 through the EGR circuit 28 along the EGR return flow path 32 back to the EGR blower 132, thereby creating a recirculation loop 48. The recirculation loop 48 includes the EGR return flow path 32 from the position 42 to the position 44 and also the EGR main flow path 30 from the position 44 to the position 42. Collectively, the recirculation loop 48 causes a flow of the exhaust gas 62 through the EGR recirculation damper 142, the EGR blower 132, and the EGR cooler 140, such that the EGR blower 132 provides pressure and flow control, and the EGR cooler 140 provides temperature control for the recirculating exhaust gas 62. Thus, the recirculation loop 48 may cause an increase in the pressure, an increase in the mass flow rate, and/or a decrease in the temperature of the exhaust gas 62. In certain embodiments, the controller 22 is configured to selectively close the EGR recirculation damper 142 to block all of the flow of exhaust gas 62 through the EGR return flow path 32, or completely open the EGR recirculation damper 142 for a maximum flow of the exhaust gas 62 through the EGR return flow path 32.

In operation, the controller 22 is configured to open the EGR inlet damper 130, close the EGR outlet damper 148, and open the EGR recirculation damper 142 during a start-up mode (e.g., a start-up procedure) of the gas turbine system 12, thereby allowing time for the combustion to ramp up and stabilize in the gas turbine system 12 prior to initiating EGR operations via the EGR system 20. During this time, the controller 22 also may selectively open or close the EGR vent damper 146 for additional control of the recirculating exhaust gas 62 in the recirculation loop 48. After the start-up mode, the controller 22 is configured to open the EGR outlet damper 148 and close the EGR recirculation damper 142 during a transition mode or a steady state mode of the gas turbine system 12, while the EGR inlet damper 130 may remain open and/or adjust a degree of opening to control the overall flow of exhaust gas 62 through the EGR system 20.

Additionally, in certain situations, the controller 22 is configured to open the EGR vent damper 146 to vent the exhaust gas 62 to the atmosphere, such as for pressure release, pressure control, and/or safety controls. For example, if the pressure in the EGR circuit 28 exceeds a maximum pressure threshold (e.g., a safety threshold), then the controller 22 may be configured to open the EGR vent damper 146. Otherwise, the controller 22 may maintain the EGR vent damper 146 in a closed position. The EGR vent damper 146 also may be used for purging of the EGR circuit 28.

The mass flow rate and/or pressure of the exhaust gas 62 flowing through the EGR circuit 28 is based on a combination of a mass flow rate and pressure of the exhaust gas 62 discharged from the turbine 56 and/or the HRSG 16, a boost pressure and mass flow rate provided by operation of the EGR blower 132 (e.g., fan 134 and IGV 136), and a degree of opening of the dampers 26 (e.g., 130, 142, 146, and 148). In certain embodiments, the controller 22 is configured to control operation of the EGR system 20 to adjust the mass flow rate, the pressure, and/or the temperature of the exhaust gas 62 by adjusting the EGR blower 132 (e.g., fan 134 and IGV 136) and/or one or more of the dampers 26 (e.g., 130, 142, 146, and 148) based on a hierarchical control strategy, wherein one or more controls are executed by the controller 22 in a particular order or sequence to achieve a target mass flow rate and/or a target pressure of the exhaust gas 62. The target mass flow rate may include a lower target mass flow rate (e.g., minimum), an upper target mass flow rate (e.g., maximum), or a range therebetween. The target pressure may include a lower pressure (e.g., minimum), an upper pressure (e.g., maximum), or a range therebetween.

In certain embodiments, the controller 22 (e.g., mass flow controller 150) may be configured to operate the multiple levels of control 151 in a sequence of the primary mass flow control 152, the secondary mass flow control 154, and the tertiary flow modulation control 156. As discussed in further detail below, the controller 22 may execute or perform the primary mass flow control 152 to adjust the EGR blower 132, including speed adjustments to the fan 134 and/or adjustments to the IGVs 136, to provide relatively rapid or real-time adjustments to the mass flow rate and/or the pressure of the exhaust gas 62. For example, the controller 22 may control the fan 134 to increase a fan speed to provide an increase in the mass flow rate and/or pressure of the exhaust gas 62 to the air intake 50 and/or decrease a fan speed to provide a decrease in the mass flow rate and/or pressure of the exhaust gas 62 to the air intake 50. The adjustments to the fan speed of the fan 134 may be achieved in substantially real-time, such as less than 1, 2, 3, 4, 5, 6, 7, 8, 9, or 10 seconds. The controller 22 also may control a degree of opening (e.g., angular position) of the IGVs 136 simultaneously, before, and/or after adjustments to the fan speed. The adjustments to the IGVs 136 also may be achieved in substantially real-time, such as less than 1, 2, 3, 4, 5, 6, 7, 8, 9, or 10 seconds. A higher mass flow rate may result in less residence time and less cooling in the EGR cooler 140, whereas a lower mass flow rate may result in greater residence time and greater cooling in the EGR cooler 140. Thus, the controller 22 also may control the EGR cooler 140 to increase or decrease a temperature and/or flow rate of a thermal fluid (e.g., water) used for cooling of the exhaust gas 62.

The controller 22 may execute or perform the secondary mass flow control 154 to adjust the EGR outlet damper 148, as a secondary control measure after or during the primary mass flow control 152. The secondary mass flow control 154 may take relatively longer (e.g., more time) than the primary mass flow control 152, and thus the secondary mass flow control 154 may be used for adjustments to the faster control by the primary mass flow control 152. For example, the controller 22 may execute or perform the secondary mass flow control 154 by increasing a degree of opening of the EGR outlet damper 148 to increase a mass flow rate of the exhaust gas 62 to the air intake 50 and/or decreasing a degree of opening of the EGR outlet damper 148 to decrease a mass flow rate of the exhaust gas 62 to the air intake 50. In certain embodiments, the controller 22 may execute or perform the primary mass flow control 152 (e.g., of EGR blower 132) for a rapid adjustment (e.g., increased or decreased mass flow rate or pressure), followed by the slower secondary mass flow control 154 (e.g., of EGR outlet damper 148 for increased or decreased mass flow rate or pressure), thereby enabling readjustments of the primary mass flow control 152 once the slower secondary mass flow control 154 catches up in the adjustments. In this manner, as discussed in further detail below, the primary mass flow control 152 (e.g., of EGR blower 132) may be readjusted to save power (e.g., reduce power consumption) as or after the slower secondary mass flow control 154 moves the EGR outlet damper 148 to the new position.

The controller 22 may execute or perform the tertiary flow modulation control 156 to adjust the EGR inlet damper 130, as a tertiary control measure after and/or during the primary mass flow control 152 or the secondary mass flow control 154. The tertiary flow modulation control 156 may take relatively longer (e.g., more time) than the primary mass flow control 152, and thus the tertiary flow modulation control 156 may be used for adjustments to the faster control by the primary mass flow control 152. For example, the controller 22 may execute or perform the tertiary flow modulation control 156 by increasing a degree of opening of the EGR inlet damper 130 to increase a mass flow rate and/or pressure of the exhaust gas 62 into the EGR circuit 28 and/or decreasing a degree of opening of the EGR inlet damper 130 to decrease a mass flow rate and/or pressure of the exhaust gas 62 into the EGR circuit 28. As discussed below, the tertiary flow modulation control 156 may be used for pressure control in the EGR circuit 28, such that the pressure in the EGR circuit 28 remains within acceptable pressure thresholds (e.g., minimum and maximum pressure thresholds). The various levels of control 151 (e.g., 152, 154, and 156) may be executed simultaneously, in sequential order, or in any suitable order, to achieve targets of the mass flow rate, the pressure, and the temperature. These levels of control 151 are discussed in further detail below.

The controller 22 is configured to control operation of the EGR system 20 in response to sensor feedback, an operating mode, user input, and the levels of control 151. The sensor feedback may include the sensor feedback from the sensors 36 (e.g., 38, 40) within the EGR system 20, and sensor feedback from sensors throughout the power plant 10 (e.g., gas turbine system 12, HRSG 16, and gas treatment system 18). The operating mode may include an operating mode of the power plant 10 and/or the gas turbine system 12, such as a start-up mode, a steady state mode, a shutdown mode, a full load mode, and/or a part-load mode. The operating mode also may include an operating mode of the EGR system 20, which also may correspond to the operating mode of the power plant 10 and/or the gas turbine system 12. In some instances, the operating mode of the EGR system 20 may include different variations of the controls 151, such as by rearranging the priority and/or sequence of the controls 151. However, in certain embodiments, the controls 151 may be prioritized as the primary mass flow control 152, the secondary mass flow control 154, and the tertiary flow modulation control 156

In operation, the controller 22 may perform such mass flow control for the EGR system 20 through the mass flow controller 150 including multiple levels of control 151, namely, primary mass flow control 152, secondary mass flow control 154, and tertiary flow modulation control 156, in response to a load on the gas turbine system 12. In certain embodiments, the setpoint (e.g., the desired mass flow of the exhaust gas 62 to be delivered to the intake 50) for the closed loop control scheme may be governed by the operating conditions (e.g., temperature, load, speed) of the gas turbine system 12. For example, the controller 22 may determine an optimal mass flow of the exhaust gas 62 to be delivered to the intake 50 in response to a change in a load of the gas turbine system 12 automatically and provide a command to the controller 22 (e.g., mass flow controller 150) to adjust the current mass flow within the EGR system 20 to the calculated optimal mass flow. Once the EGR mass flow setpoint is provided, the controller 22 may determine the current flow characteristics (e.g., current mass flow, current pressure) of the exhaust gas 62 within the EGR system 20 through the sensors 36 (e.g., sensors 38 and 40) therein.

Based on the mass flow setpoint and the current flow characteristics, the mass flow controller 150 may compute suitable EGR mass flow control commands to modulate the EGR flow (e.g., exhaust gas 62). The mass flow controller 150 may modulate the EGR flow via the primary mass flow control 152 by adjusting operating conditions of the EGR blower 132, such as adjusting a fan speed of the fan 134 and/or the positions of one or more IGVs 136. For example, the primary mass flow control 152 may determine a new fan speed and/or new IGV positions, such that the EGR flow may exhibit new flow characteristics satisfactorily matching the mass flow setpoint (e.g., within 2% of the mass flow setpoint). In certain embodiments, the determination of the new operating conditions of the EGR blower 132 is accomplished based on look-up tables and/or a computer model representing the operational properties of the EGR blower 132 and the EGR duct flow properties of the EGR system 20. Accordingly, the primary mass flow control 152 may provide commands to adjust operating conditions of the EGR blower 132, such as through scheduling an operating point indicative of the new fan speed and/or the new IGV positions within the fan operation envelope of the mass flow controller 150. By directly manipulating the operational conditions of the EGR blower 132, the primary mass flow control 152 may invoke a relatively fast response, providing a quick modulation of the EGR. Accordingly, the EGR system 20 may begin delivering EGR flow at the mass flow setpoint upon achieving the new fan speed and/or the new IGV positions.

By way of example, to increase the mass flow within the EGR system 20, the primary mass flow control 152 may provide commands to increase the fan speed of the EGR blower 132. However, in this example, the increased fan speed of the EGR blower 132 may lead to an elevated pressure of the EGR flow downstream of EGR blower 132 and, ultimately, an increased auxiliary power consumption by the EGR blower 132.

To address the increased power consumption, in the control architecture of the present disclosure, the mass flow controller 150 may modulate the EGR flow via the secondary mass flow control 154 to maintain power optimized operation of the EGR blower 132. The secondary mass flow control 154 may provide commands to adjust the position of the EGR outlet damper 148, such as through scheduling an outlet damper position of the mass flow controller 150. As previously described, the EGR outlet damper 148 may include movable blades that can be adjusted to different positions (e.g., angles) within a range of movement between a fully closed position (e.g., angular position of 0°) and a fully opened position (e.g., angular position of 90°) to modulate the EGR flow passing through the damper 148. In certain embodiments, the dampers can be adjusted to any angle within the range of movement, while in other embodiments, the dampers may only be set to certain discrete, predefined angles (e.g., 0°, 5°, 10°, 15°, . . . , 90°). By adjusting the position of the EGR outlet damper 148, the pressure of the EGR flow downstream of the EGR blower 132 may change, causing the primary mass flow control 152 to adjust the fan speed of the fan 134 to maintain the mass flow at the desired level. As such, the power consumption of the EGR blower 132 may reduce as a result of the adjusted fan speed.

Returning to the previous example where the fan speed of the EGR blower 132 is increased to increase the mass flow, the secondary mass flow control 154 may adjust the EGR outlet damper 148 to a wider angular position to allow more EGR flow be delivered from the EGR system 20 to the gas turbine system 12. In doing so, the pressure of the EGR flow downstream of the EGR blower 132 may decrease, causing a reduction of the fan speed of the fan 134 and, ultimately, a reduction of the power consumption.

The angular position of the EGR outlet damper 148 may be subject to various limitations. For example, the EGR blower 132 may be subject to certain design limits that require the EGR flow to maintain a certain minimum downstream pressure at a given mass flow and, thus, impose a maximum angular position of the EGR outlet damper 148. In certain embodiments, the secondary mass flow control 154 provide commands to open the EGR outlet damper 148 as widely as the EGR system 20 and its components therein allow, such that the pressure of the EGR flow downstream of the EGR blower 132 may be minimized as much as possible. By doing so, the primary mass flow control 152 may reduce the fan speed of the fan 134 as much as possible while maintaining the mass flow at the desired level, thereby maximizing the reduction of the power consumption.

Thus, in the presently disclosed control architecture, the primary mass flow control 152 may govern the mass flow control via adjusting operating conditions of the EGR blower 132 (namely, the fan speed of the fan 134 and/or the positions of one or more IGVs 136), while delegating power optimization of the EGR blower 132 to the secondary mass flow control 154. The secondary mass flow control 154 may, in turn, leverage the primary mass flow control 152 to optimize power consumption of the EGR blower 132 by adjusting the position of the EGR outlet damper 148. Collectively, the primary mass flow control 152 and the secondary mass flow control 154 provide a closed loop EGR mass flow control scheme that optimizes auxiliary power consumption by the blower EGR 132.

As appreciated, the mass flow controller 150 may increase the mass flow rate by first using the primary mass flow control 152 (e.g., increase fan speed of fan 134 and/or increase opening of IGVs 136) followed by the secondary mass flow control 154 (e.g., increase opening of EGR outlet damper 148), and then readjusting the primary mass flow control 152 for power consumption (e.g., decreasing fan speed of fan 134) as described above. Alternatively, in some instances, the mass flow controller 150 may decrease the mass flow rate by first using the primary mass flow control 152 (e.g., decreasing fan speed of fan 134 and/or decreasing opening of IGVs 136) followed by the secondary mass flow control 154 (e.g., adjusting the opening of EGR outlet damper 148), and then readjusting the primary mass flow control 152 for power consumption (e.g., decreasing fan speed of fan 134) as described above. In this instance, for minimizing power consumption, the EGR outlet damper 148 may be fully open while minimizing the fan speed of the fan 134. However, the primary and secondary flow controls 152 and 154 may be used together in various ways to achieve a rapid response and low power consumption.

Additionally, the mass flow controller 150 may include the tertiary flow modulation control 156 in further support of the primary and secondary flow controls 152 and 154. The tertiary flow modulation control 156 may provide commands to adjust the position of the EGR inlet damper 130 to control the pressure within the EGR circuit 28, such that the system 20 operates within mechanical design boundaries of the EGR circuit 28. For example, when the pressure sensor 38 provides sensor data (i.e., pressure measurement 138) indicative of a EGR duct pressure slightly above a maximum design limit of the EGR circuit 28, the tertiary flow modulation control 156 may throttle the EGR inlet damper 130 to a narrower angular position to produce a suitable pressure drop of exhaust gas 62 to enter the EGR system 20. Similarly, when the pressure sensor 38 provides sensor data indicative of a EGR duct pressure slightly below a minimum design limit of the EGR circuit 28, the tertiary flow modulation control 156 may adjust the EGR inlet damper 130 to a wider angular position to produce less pressure drop of exhaust gas 62 to enter the EGR system 20. The thresholds at which changes to position of the EGR inlet damper 130 are triggered may be defined within the mass flow controller 150 or stored in memory 122 of controller 22 (thus defining the terms "slightly above" and "slightly below"). Any change in mass flow as a result of position adjustment of the EGR inlet damper 130 may then be compensated by the primary mass flow control 152 and the secondary mass flow control 154.

Thus, a closed loop controller 150 for mass flow control in the EGR system 20, which includes the primary mass flow control 152, the secondary mass flow control 154, and the tertiary flow modulation control 156, is segregated from other controllers of the controller 22. By integrating the three levels of control together, the mass flow controller 150 may operate independently to provide precise mass flow closed loop control within the EGR system 20; to optimize power consumption of the EGR blower 132; and to safeguard the EGR system 20 within its design boundaries.

Figure 2:
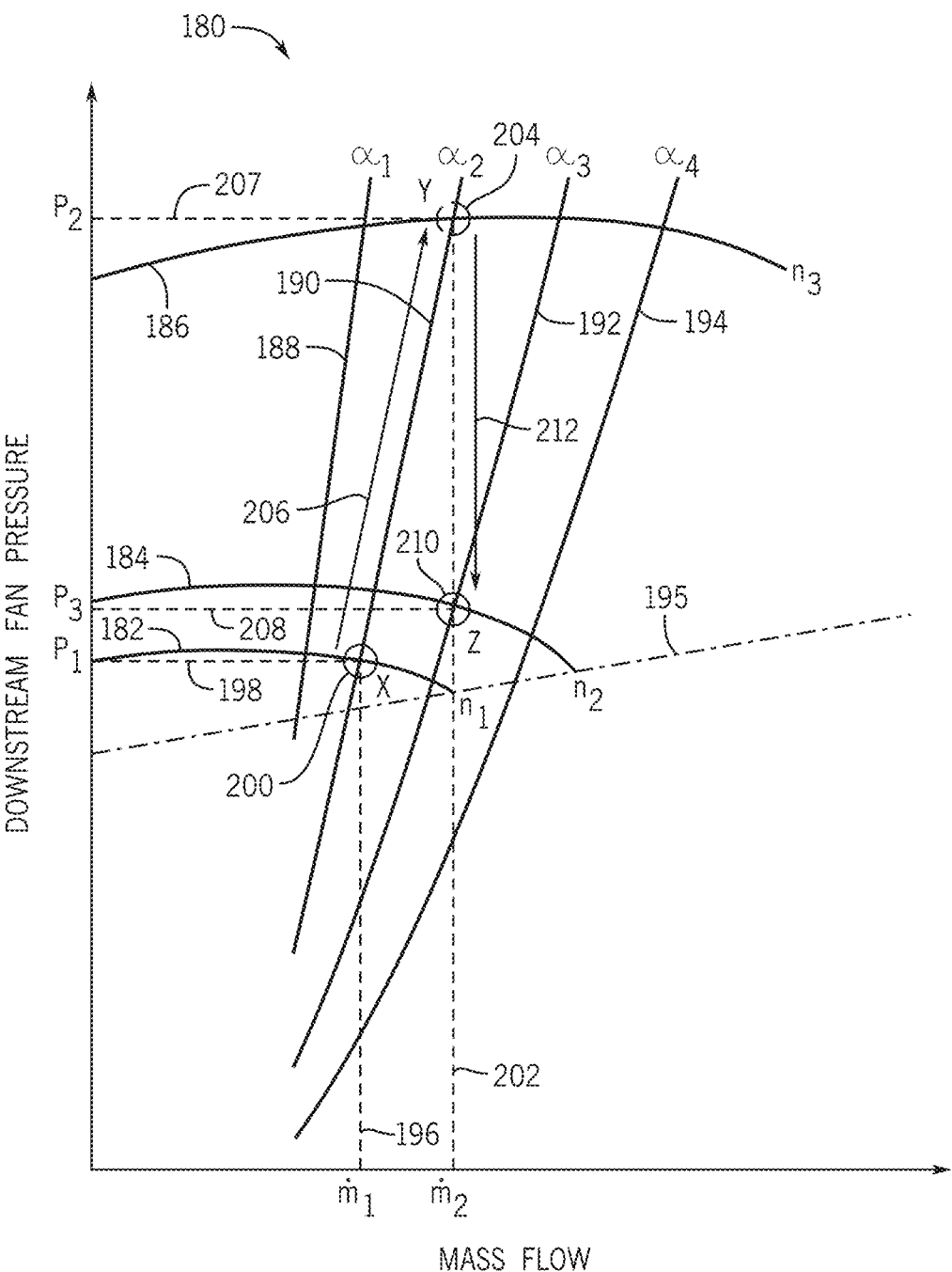
FIG. 2 is an exemplary performance curve chart of the EGR system of FIG. 1, where the mass flow controller of the EGR system may compute commands to control the mass flow of an EGR flow into an intake of the gas turbine system.

FIG. 2 is a graph of downstream fan pressure versus mass flow to help illustrate further how the mass flow controller 150 may respond to an exemplary change in mass flow setpoint. For example, FIG. 2 illustrates a performance curve chart 180 of the EGR system 20 of FIG. 1, wherein the mass flow controller 150 of the EGR system 20 may compute commands to control the mass flow of the EGR flow (e.g., exhaust gas 62 in the EGR system 20). In certain embodiments, the performance curve chart 180 and controls 151 based thereon may be programmed into the controller 22 (e.g., mass flow controller 150) for control of the EGR system 20. The performance curve chart 180 may include a plurality of fan speed curves, such as curves 182, 184, and 186, and a plurality of outlet damper position curves indicative of duct characteristics at various positions of EGR outlet damper 148, such as curves 188, 190, 192, and 194. More specifically, the plurality of fan speed curves 182, 184, 186 is indicative of fan characteristics at a plurality of respective fan speeds, whereas the plurality of outlet damper position curves 188, 190 192, 194 is indicative of duct characteristics for a plurality of respective positions of EGR outlet damper 148.

For example, the fan speed curves 182, 184, and 186 describe the relationship of mass flow and downstream fan pressure (i.e., pressure downstream of the fan 134) when the fan 134 is operating at fan speeds of $n_1$, $n_2$, and $n_3$, respectively, where $n_1 < n_2 < n_3$. The outlet damper position curves 188, 190, 192, and 194 describe the relationship of mass flow and downstream fan pressure when the outlet damper 148 is at damper positions $\alpha_1$, $\alpha_2$, $\alpha_3$, and $\alpha_4$, respectively indicating a degree of openness, where $\alpha_1 < \alpha_2 < \alpha_3 < \alpha_4$. It should be noted that the performance chart 180 includes a flow threshold line 195 (e.g., lower flow threshold or minimum flow). Due to restraints associated with the fan 134, the EGR system 20 is designed to only operate at a mass flow and a downstream fan pressure above the flow threshold line 195.

The EGR system 20 may operate based on control commands of the mass flow controller 150. The mass flow controller 150 may monitor the operational conditions (e.g., mass flow, downstream fan pressure) of the EGR system 20 by polling mass flow and pressure measurements 144, 138 of the EGR flow continuously or periodically via the sensors 36 in the EGR system 20, such as the sensors 40 and 38. For example, the mass flow controller 150 may receive sensor data from the sensors 38 and 40 and determine that the EGR system 20 is currently delivering the EGR flow to the gas turbine system 12 at a first mass flow $\dot{m}_1$ 196 and a first downstream fan pressure $P_1$ 198, as indicated by a first operating point X 200 on the performance chart 180. It should be noted that, as shown, the first operating point X 200 is located on the outlet damper position curve 190, indicating that the EGR outlet damper 148 is currently open at a damper position $\alpha_2$.

During operation, the mass flow controller 150 may receive a new mass flow setpoint at a second mass flow $\dot{m}_2$ 202. In response, the mass flow controller 150 may compute suitable EGR mass flow control commands to modulate the EGR flow to increase the mass flow to the second mass flow $\dot{m}_2$ 202.

As previously described, the primary mass flow control 152 may modulate the EGR flow by first adjusting the operating conditions of the EGR blower 132, such as by adjusting the fan speed of the fan 134 and/or the positions of the one or more IGVs 136. Since the primary mass flow control 152 does not change the position of the EGR outlet damper 148, any adjustment of the fan speed of the fan 134 may move the operational conditions of the EGR system 20 along the outlet damper position curve 190.

To increase the mass flow to the second mass flow $\dot{m}_2$ 202, the primary mass flow control 152 may provide commands to increase the fan speed of the fan 134. Thus, the primary mass flow control 152 may cause the EGR system 20 to deliver the EGR flow to the gas turbine system 12 at the second mass flow $\dot{m}_2$ 202, moving the operation conditions of the EGR system 20 from the first operating point X 200 to a second operating point Y 204 along a path 206 on the performance chart 180. As shown, such adjustment of the operating conditions of the EGR blower 132 may cause an increase in the downstream fan pressure from the first pressure $P_1$ 198 to a second pressure $P_2$ 207. It may also increase the fan speed from $n_1$ to $n_3$, potentially causing a drastic increase in power consumption by the EGR blower 132.

Then, the secondary mass flow control 154 may further modulate the EGR flow to maintain power optimized operation of the EGR blower 132 by providing commands to adjust the position (e.g., increase an opening) of the EGR outlet damper 148. The secondary mass flow control 154 may provide commands to increase the opening position of the EGR outlet damper 148 from the damper position $\alpha_2$ to a wider (e.g., more open) damper position $\alpha_3$. As the EGR outlet damper 148 progressively opens from damper position $\alpha_2$ to damper position $\alpha_3$, the primary mass flow control 152 may reduce the fan speed of the fan 134 from $n_3$ to $n_2$ to maintain the mass flow at the second mass flow $\dot{m}_2$ 202, reducing the downstream fan pressure from the second pressure $P_2$ 207 to a third pressure $P_3$ 208. Thus, the secondary mass flow control 154 may move the operation conditions of the EGR system 20 from the second operating point Y 204 to a third operating point Z 210 along a path 212 on the performance chart 180. In certain embodiments, the foregoing control steps of the primary and secondary mass flow controls 152 and 154 may be performed sequentially, simultaneously, or partially overlapping with one another. For example, when moving from the second operating point Y 204 to the third operating point Z 210 along the path 212, the mass flow controller 150 may simultaneously operate the primary and secondary mass flow controls 152 and 154 as fine tuning for improved power consumption by reducing the fan speed of the fan 134 while opening the EGR outlet damper 148 to maintain the second mass flow $\dot{m}_2$ 202.

In this example, while the EGR outlet damper 148 may have an even wider (e.g., more open) damper position $\alpha_4$, the secondary mass flow control 154 may not provide commands to further widen the opening angle of the EGR outlet damper 148. At the second mass flow $\dot{m}_2$ 202, opening the EGR outlet damper 148 to damper position $\alpha_4$ causes the EGR system 20 to perform below the flow threshold line 195 and outside of the design boundary. In scenarios where the EGR outlet damper 148 may only be opened to certain discrete, predefined damper positions, the damper position $\alpha_3$ is the widest allowable angle of opening of the EGR outlet damper 148 as controlled by the mass flow controller 150. Thus, at the damper position $\alpha_3$, the EGR blower 132 operates at the lowest allowable fan speed above the flow threshold line 195 to deliver the EGR flow at the second mass flow $\dot{m}_2$ 202, thereby reducing or optimizing the power consumption of the EGR blower 132.

While the primary mass flow control 152 and the secondary mass flow control 154 collectively increase the mass flow from the first mass flow $\dot{m}_1$ 196 to the second mass flow $\dot{m}_2$ 202, the tertiary flow modulation control 156 may act as a limiter, throttling the EGR inlet damper 130 to ensure the EGR system 20 is operating within the mechanical design boundaries of the EGR circuit 28. For example, the tertiary flow modulation control 156 may receive a downstream fan pressure measurement of $P_2$ from the pressure sensor 38 after the primary mass flow control 152 moves the operation conditions of the EGR system 20 to the second operating point Y 204, where the pressure measurement of $P_2$ may be beyond the mechanical design boundaries of the EGR circuit 28. In response, the tertiary flow modulation control 156 may throttle the EGR inlet damper 130 to reduce the EGR system pressure. In certain embodiments, the tertiary flow modulation control 156 continuously or periodically receives the downstream fan pressure measurement of $P_2$ from the pressure sensor 38 and adjusts (e.g., reduces) the degree of opening of the EGR inlet damper 130 to reduce the pressure of the exhaust gas 62 in the EGR circuit 28 to remain below a maximum pressure threshold.

In some embodiments, the tertiary flow modulation control 156 continuously or periodically receives the downstream fan pressure measurement of $P_2$ from the pressure sensor 38 and adjusts (e.g., decreases) the degree of opening of the EGR inlet damper 130 to decrease the pressure of the exhaust gas 62 in the EGR circuit 28 to remain below a maximum pressure threshold. In some embodiments, the tertiary flow modulation control 156 may continuously or periodically receive a downstream mass flow measurement from the mass flow sensor 40 and may adjust (e.g., increases or decreases) the degree of opening of the EGR inlet damper 130 to adjust (e.g., increase or decrease) the incoming mass flow rate of the exhaust gas 62 in the EGR circuit 28 to remain within a mass flow rate range (e.g., between minimum and maximum thresholds).

In certain embodiments, if the mass flow controller 150 receives a new mass flow setpoint lower than the current mass flow, the mass flow controller 150 may follow the same control architecture (e.g., a sequence of primary and secondary mass flow controls 152 and 154) and/or a reversed control architecture (e.g., a sequence of secondary and primary mass flow controls 154 and 152) to reduce the mass flow. For example, the reversed flow architecture may first modulate the EGR outlet damper 148 via the secondary mass flow control 154 to achieve the new mass flow setpoint, followed by fine tuning using both the primary and secondary mass flow controls 152 and 154 (e.g., adjust the fan 134 and adjust the EGR outlet damper 148) to maintain the new mass flow setpoint while reducing power consumption by the fan 134.

Alternatively, the mass flow controller 150 may use the same control architecture used for increasing the mass flow rate, although the controls are constrained by the flow threshold line 195. For example, the mass flow controller 150 may initially reduce the fan speed of the fan 134 to reduce the mass flow rate toward the new mass flow setpoint. If the reduction in fan speed is able to achieve the new mass flow setpoint without dropping the downstream fan pressure below the flow threshold line 195, then the mass flow controller 150 may then perform fine tuning using both the primary and secondary mass flow controls 152 and 154 (e.g., adjust the fan 134 and adjust the EGR outlet damper 148) to maintain the new mass flow setpoint while reducing power consumption by the fan 134. However, if the reduction in fan speed results in the downstream fan pressure dropping to the flow threshold line 195, then the mass flow controller 150 may then perform fine tuning using both the primary and secondary mass flow controls 152 and 154 (e.g., adjust the fan 134 and adjust the EGR outlet damper 148) to maintain the downstream pressure at or above the flow threshold line 195 while moving the mass flow rate toward the new mass flow setpoint. Again, the tertiary flow modulation control 156 may ensure the EGR system 20 is operating within the mechanical design boundaries of the EGR circuit 28 by monitoring the downstream fan pressure and providing commands to throttle the EGR inlet damper 130 if necessary.

FIG. 3 is a process flow diagram illustrating a method 240 by which the EGR system 20 of FIGS. 1 and 2 and the like may control mass flow of an exhaust gas 62 to be delivered to the gas turbine system 12. It should be noted that the steps of the method 240 illustrated in FIG. 3 and described in detail below are exemplary and should not be taken to necessarily imply a chronological order of the method 240. While the steps of the method 240 may be performed in the order illustrated in FIG. 3, presently disclosed embodiments include any suitable ordering and/or chronology of these steps. Further, certain aspects of the method 240 may include steps other than those illustrated in FIG. 3. Further still, certain steps of the method 240 illustrated in FIG. 3 may be omitted and/or altered in other aspects. The method 240 may be executed by the controller 22 (e.g., the mass flow controller 150) and/or a processor-based device, such as a computer system.

The method 240 may include monitoring (block 242) operational conditions (e.g., mass flow, downstream fan pressure) of the EGR system 20 to obtain feedback. The mass flow controller 150 may obtain mass flow and pressure measurements 144, 138 of the EGR flow continuously or periodically via the sensors 36 in the EGR system 20, such as the sensors 40 and 38. In some embodiments, such measurements may be made downstream of the EGR blower 132 (e.g., downstream of fan 134) to measure the flow characteristics of the modulated exhaust gas 62 in the main flow path 30 of the EGR system 20. In certain embodiments, the obtained mass flow and pressure measurements 144, 138 may be compared against a current setpoint (e.g., mass flow setpoint) of the mass flow controller 150. If the obtained mass flow indicates a deviation from the current setpoint of the mass flow controller 150, the mass flow controller 150 may begin controlling the mass flow without receiving any indication of a new setpoint to compensate for the deviation.

The method may include receiving (block 244) an indication of a new mass flow setpoint. The new mass flow setpoint may be provided by other control schemes of the controller 22, such as a control scheme and/or an operational mode (e.g., part-load, full load, start-up, steady state, shutdown, etc.) associated with the gas turbine system 12. The controller 22 may monitor the operational conditions of the combustion process of the gas turbine system 12 and determine a desired mass flow of the recirculated EGR flow to be delivered to the gas turbine system. In certain embodiments, the desired mass flow may decrease a current combustion temperature to a desired combustion temperature to reduce the NOx formation.

The method may include obtaining (block 246) a mass flow measurement 144 in the EGR circuit 28. Upon receiving the indication of the new mass flow setpoint, the mass flow controller 150 may receive a current mass flow measurement if it is not already obtained. The current mass flow measurement may be higher or lower than the new mass flow setpoint.

The method may include performing (block 248) primary mass flow control 152 by adjusting the fan speed and/or IGV positions to match the new mass flow setpoint. In certain embodiments, the mass flow controller 150 may determine a new fan speed and/or new IGV positions based on the difference between the mass flow measurement 144 and the new mass flow setpoint. In other embodiments, such determination of the new fan speed and/or the new IGV positions may be determined based on referencing a performance chart similar to the chart 180 of FIG. 2. As such, the primary mass flow control 152 may cause the EGR flow to be delivered at a new mass flow rate matching the new mass flow setpoint. For example, the new mass flow rate may be within a satisfactory threshold (e.g., within 2%) of the new mass flow setpoint.

The method may include performing (block 250) secondary mass flow control 154 by adjusting the position of the EGR outlet damper 148 to optimize auxiliary power consumption by the fan 134. In certain embodiments, the mass flow controller 150 may gradually adjust the position of the EGR outlet damper 148 until the EGR system 20 is operating near (e.g., within a threshold from) the flow threshold line 195 or other design/operational limits of the EGR system 20. In other embodiments, such determination of the new EGR outlet damper position may be determined based on referencing a performance chart similar to the chart 180 of FIG. 2. Any adjustment of the position of the EGR outlet damper 148 may cause the primary mass flow control 152 to continue adjusting the fan speed of the fan 134 such that the mass flow of the EGR flow is maintained at the new mass flow setpoint. As previously described with respect to FIG. 2, in certain embodiments, however, the secondary mass flow control 154 may provide commands to maintain the current position of the EGR outlet damper 148. For example, the EGR outlet damper 148 may have already been set at the maximum angular position allowed by the EGR outlet damper 148 and/or operational parameters of the EGR system 20, such that any increase of the angular position may lead the EGR system 20 to perform outside of its operational limits.

The method may include obtaining (block 252) a pressure measurement 138 in the EGR circuit 28. Such pressure measurement may be made via the pressure sensor 38. In certain embodiments, the EGR system 20 may include other sensors 36 (e.g., pressure sensors 38) disposed at various locations throughout the EGR circuit 28 to monitor the EGR flow pressure within the system 20.

The method may include performing (block 254) tertiary flow modulation control 156 by adjusting the position of the EGR inlet damper 130 to maintain EGR duct pressure within design limits. If any pressure measurement 138 indicates a pressure in the EGR circuit 28 within a threshold of the design limits or exceeding the design limits, the tertiary flow modulation control 156 may throttle the position of the EGR inlet damper 130 to ensure seamless operations of the EGR system 20. Any adjustment of the position of the EGR inlet damper 130 may cause the primary mass flow control 152 and/or the secondary mass flow control 154 to continue controlling the EGR blower 132 and/or the EGR outlet damper 148 to continue maintaining the mass flow of the EGR flow at the new mass flow setpoint and ensuring a power optimized operation of the EGR blower 132.

As illustrated, in certain embodiments, upon the EGR system 20 delivering the EGR flow at the new mass flow setpoint, conducting power optimized operation of the EGR blower, and operating within the design limits, the method may route back to block 242 to continue monitoring the operational conditions of the EGR system 20.

Technical effects of the disclosed embodiments include integration of a control scheme having multiple levels of control for controlling mass flow of an exhaust gas flow delivered from the EGR system to the gas turbine system within an industrial plant, such as a power plant having a gas turbine system. The mass flow of the exhaust gas flow to be delivered to the intake section of the gas turbine system may be determined by the operational conditions of the combustion process within the gas turbine system.

More specifically, the presently disclosed closed loop controller may include 1) a primary mass flow control that modulates the mass flow of the EGR flow by adjusting operating conditions of an EGR blower for a rapid (e.g., substantially real-time) adjustment of the mass flow rate; 2) a secondary mass flow control that maintains power optimized operation of the EGR blower by adjusting the position of an EGR outlet damper along with adjustments of the EGR blower; and 3) a tertiary flow modulation control that limits the EGR system within mechanical design boundaries of the EGR circuit by throttling the position of an EGR inlet damper. As such, the presently disclosed embodiments may operate independently to provide precise mass flow control within the EGR system; to optimize power consumption of the blower; and to safeguard the EGR system within its design boundaries. Accordingly, the disclosed embodiments may improve control and operation of industrial plants and enhance performance (e.g., reduce auxiliary power consumption), while achieving desired combustion operability requirements (e.g., maintaining minimum oxygen requirements).

The subject matter described in detail above may be defined by one or more clauses, as set forth below.

A system includes a gas turbine system having a compressor, a combustor, and a turbine, wherein the gas turbine system is configured to combust a fuel and output an exhaust gas; an exhaust gas recirculation (EGR) system coupled to the gas turbine system, wherein the EGR system includes: an EGR circuit, an EGR inlet damper coupled to the EGR circuit, an EGR outlet damper coupled to the EGR circuit, and an EGR blower coupled to the EGR circuit between the EGR inlet damper and the EGR outlet damper; and a controller having a processor, a memory, and instructions stored on the memory and executable by the processor to perform: receiving a first indication to increase a mass flow rate of the exhaust gas through the EGR circuit to the gas turbine system from a first mass flow rate to a second mass flow rate; controlling, via a first control, the EGR blower in response to the first indication to increase the mass flow rate from the first mass flow rate to the second mass flow rate; and controlling, via a second control, the EGR outlet damper and the EGR blower to decrease a power consumption of the EGR blower while substantially maintaining the mass flow rate at the second mass flow rate.

The system of the preceding clause, wherein the first indication includes a first setpoint based at least partially on an operating condition of the gas turbine system.

The system of any preceding clause, wherein the first indication includes a first setpoint based at least partially on sensor feedback from one or more sensors coupled to the EGR circuit.

The system of any preceding clause, wherein the controller is configured to perform controlling, via the first control, the EGR blower to provide a substantially real-time increase in the mass flow rate from the first mass flow rate to the second mass flow rate.

The system of any preceding clause, wherein the controller is configured to perform controlling, via the first control, the EGR blower to increase the mass flow rate from the first mass flow rate to the second mass flow rate occurs prior to controlling, via the second control, the EGR outlet damper and the EGR blower to decrease the power consumption.

The system of any preceding clause, wherein the controller is configured to perform controlling, via the first control, the EGR blower to increase the mass flow rate at least by increasing a fan speed of a fan of the EGR blower.

The system of any preceding clause, wherein the controller is configured to perform controlling, via the first control, the EGR blower to increase the mass flow rate at least by increasing a degree of opening of an inlet guide vane (IGV) of the EGR blower.

The system of any preceding clause, wherein the controller is configured to perform controlling, via the second control, the EGR outlet damper and the EGR blower at least by: increasing a degree of opening of the EGR outlet damper, decreasing a fan speed of a fan of the EGR blower to reduce the power consumption of the EGR blower, and coordinating the increasing degree of opening and the decreasing fan speed to provide for substantially maintaining the mass flow rate at the second mass flow rate.

The system of any preceding clause, wherein the controller is configured to perform controlling, via a third control, the EGR inlet damper to maintain a pressure in the EGR circuit below a maximum pressure threshold.

The system of any preceding clause, wherein the controller is configured to perform controlling, via the third control, the EGR inlet damper to maintain the pressure below the maximum pressure threshold after the first and second controls.

The system of any preceding clause, wherein the EGR system further comprises an EGR cooler along the EGR circuit between the EGR blower and the EGR outlet damper; and wherein the controller is configured to perform controlling of the EGR cooler.

The system of any preceding clause, wherein the controller is configured to perform controlling an EGR recirculation damper along a return path of the EGR circuit, and the return path extends from a first position downstream of the EGR blower and the EGR cooler to a second position upstream of the EGR blower and downstream of the EGR inlet damper.

The system of any preceding clause, wherein the controller is configured to perform: receiving a second indication to decrease the mass flow rate of the exhaust gas through the EGR circuit to the gas turbine system from second mass flow rate to a third mass flow rate, controlling the EGR outlet damper to decrease the mass flow rate from the second mass flow rate to the third mass flow rate, and controlling the EGR outlet damper and the EGR blower to decrease a power consumption of the EGR blower while substantially maintaining the mass flow rate at the third mass flow rate.

A system includes a controller having a processor, a memory, and instructions stored on the memory and executable by the processor to perform: receiving a first indication to increase a mass flow rate of an exhaust gas through an exhaust gas recirculation (EGR) circuit of an EGR system coupled to a gas turbine system from a first mass flow rate to a second mass flow rate, wherein the gas turbine system includes a compressor, a combustor, and a turbine, wherein the gas turbine system is configured to combust a fuel and output the exhaust gas. The controller is further configured to perform: controlling, via a first control, an EGR blower of the EGR circuit in response to the first indication to increase the mass flow rate from the first mass flow rate to the second mass flow rate. The controller is further configured to perform: controlling, via a second control, an EGR outlet damper and the EGR blower of the EGR circuit to decrease a power consumption of the EGR blower while substantially maintaining the mass flow rate at the second mass flow rate.

The system of the preceding clause, wherein the controller is configured to perform controlling, via the first control, the EGR blower to increase the mass flow rate at least by increasing a fan speed of a fan of the EGR blower, increasing a degree of opening of an inlet guide vane (IGV) of the EGR blower, or a combination thereof.

The system of any preceding clause, wherein the controller is configured to perform controlling, via the second control, the EGR outlet damper and the EGR blower at least by: increasing a degree of opening of the EGR outlet damper, decreasing a fan speed of a fan of the EGR blower to reduce the power consumption of the EGR blower, and coordinating the increasing degree of opening and the decreasing fan speed to provide for substantially maintaining the mass flow rate at the second mass flow rate.

The system of any preceding clause, wherein the controller is configured to perform controlling, via a third control, the EGR inlet damper to maintain a pressure in the EGR circuit below a maximum pressure threshold.

A method of controlling a mass flow of an exhaust gas to be delivered from an exhaust gas recirculation (EGR) system to a gas turbine system includes: receiving, via a controller, a first indication to increase a mass flow rate of an exhaust gas through an EGR circuit of an EGR system coupled to the gas turbine system from a first mass flow rate to a second mass flow rate, wherein the gas turbine system includes a compressor, a combustor, and a turbine, wherein the gas turbine system is configured to combust a fuel and output the exhaust gas; controlling, via a first control of the controller, an EGR blower of the EGR circuit in response to the first indication to increase the mass flow rate from the first mass flow rate to the second mass flow rate; and controlling, via a second control of the controller, an EGR outlet damper and the EGR blower of the EGR circuit to decrease a power consumption of the EGR blower while substantially maintaining the mass flow rate at the second mass flow rate.

The method of the preceding clause, including controlling, via the first control of the controller, the EGR blower to increase the mass flow rate at least by increasing a fan speed of a fan of the EGR blower, increasing a degree of opening of an inlet guide vane (IGV) of the EGR blower, or a combination thereof.

The method of any preceding clause, including controlling, via the second control of the controller, the EGR outlet damper and the EGR blower at least by: increasing a degree of opening of the EGR outlet damper, decreasing a fan speed of a fan of the EGR blower to reduce the power consumption of the EGR blower, and coordinating the increasing degree of opening and the decreasing fan speed to provide for substantially maintaining the mass flow rate at the second mass flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a gas turbine system having a compressor, a combustor, and a turbine, wherein the gas turbine system is configured to combust a fuel and output an exhaust gas;
an exhaust gas recirculation (EGR) system coupled to the gas turbine system, wherein the EGR system comprises:
an EGR circuit;
an EGR inlet damper coupled to the EGR circuit;
an EGR outlet damper coupled to the EGR circuit; and
an EGR blower coupled to the EGR circuit between the EGR inlet damper and the EGR outlet damper; and
a controller having a processor, a memory, and instructions stored on the memory and executable by the processor to perform:
receiving a first indication to increase a mass flow rate of the exhaust gas through the EGR circuit to the gas turbine system from a first mass flow rate to a second mass flow rate;

23 controlling, via a first control, the EGR blower in response to the first indication to increase the mass flow rate from the first mass flow rate to the second mass flow rate; and controlling, via a second control, the EGR outlet damper and the EGR blower to decrease a power consumption of the EGR blower while substantially maintaining the mass flow rate at the second mass flow rate.

2. The system of claim 1, wherein the first indication comprises a first setpoint based at least partially on an operating condition of the gas turbine system.

3. The system of claim 1, wherein the first indication comprises a first setpoint based at least partially on sensor feedback from one or more sensors coupled to the EGR circuit.

4. The system of claim 1, wherein the controller is configured to perform controlling, via the first control, the EGR blower to provide a substantially real-time increase in the mass flow rate from the first mass flow rate to the second mass flow rate.

5. The system of claim 1, wherein the controller is configured to perform controlling, via the first control, the EGR blower to increase the mass flow rate from the first mass flow rate to the second mass flow rate occurs prior to controlling, via the second control, the EGR outlet damper and the EGR blower to decrease the power consumption.

6. The system of claim 1, wherein the controller is configured to perform controlling, via the first control, the EGR blower to increase the mass flow rate at least by increasing a fan speed of a fan of the EGR blower.

7. The system of claim 1, wherein the controller is configured to perform controlling, via the first control, the EGR blower to increase the mass flow rate at least by increasing a degree of opening of an inlet guide vane (IGV) of the EGR blower.

8. The system of claim 1, wherein the controller is configured to perform controlling, via the second control, the EGR outlet damper and the EGR blower at least by:

increasing a degree of opening of the EGR outlet damper;

decreasing a fan speed of a fan of the EGR blower to reduce the power consumption of the EGR blower; and coordinating the increasing degree of opening and the decreasing fan speed to provide for substantially maintaining the mass flow rate at the second mass flow rate.

9. The system of claim 1, wherein the controller is configured to perform controlling, via a third control, the EGR inlet damper to maintain a pressure in the EGR circuit below a maximum pressure threshold.

10. The system of claim 9, wherein the controller is configured to perform controlling, via the third control, the EGR inlet damper to maintain the pressure below the maximum pressure threshold after the first and second controls.

11. The system of claim 1, wherein the EGR system further comprises an EGR cooler along the EGR circuit between the EGR blower and the EGR outlet damper; and wherein the controller is configured to perform controlling of the EGR cooler.

12. The system of claim 11, wherein the controller is configured to perform controlling an EGR recirculation damper along a return path of the EGR circuit, and the return path extends from a first position downstream of the EGR blower and the EGR cooler to a second position upstream of the EGR blower and downstream of the EGR inlet damper.

13. The system of claim 1, wherein the controller is configured to perform:

24 receiving a second indication to decrease the mass flow rate of the exhaust gas through the EGR circuit to the gas turbine system from second mass flow rate to a third mass flow rate;

controlling the EGR outlet damper to decrease the mass flow rate from the second mass flow rate to the third mass flow rate; and controlling the EGR outlet damper and the EGR blower to decrease a power consumption of the EGR blower while substantially maintaining the mass flow rate at the third mass flow rate.

14. A system, comprising:

a controller having a processor, a memory, and instructions stored on the memory and executable by the processor to perform:

receiving a first indication to increase a mass flow rate of an exhaust gas through an exhaust gas recirculation (EGR) circuit of an EGR system coupled to a gas turbine system from a first mass flow rate to a second mass flow rate, wherein the gas turbine system comprises a compressor, a combustor, and a turbine, wherein the gas turbine system is configured to combust a fuel and output the exhaust gas;

controlling, via a first control, an EGR blower of the EGR circuit in response to the first indication to increase the mass flow rate from the first mass flow rate to the second mass flow rate; and controlling, via a second control, an EGR outlet damper and the EGR blower of the EGR circuit to decrease a power consumption of the EGR blower while substantially maintaining the mass flow rate at the second mass flow rate.

15. The system of claim 14, wherein the controller is configured to perform controlling, via the first control, the EGR blower to increase the mass flow rate at least by increasing a fan speed of a fan of the EGR blower, increasing a degree of opening of an inlet guide vane (IGV) of the EGR blower, or a combination thereof.

16. The system of claim 14, wherein the controller is configured to perform controlling, via the second control, the EGR outlet damper and the EGR blower at least by:

increasing a degree of opening of the EGR outlet damper;

decreasing a fan speed of a fan of the EGR blower to reduce the power consumption of the EGR blower; and coordinating the increasing degree of opening and the decreasing fan speed to provide for substantially maintaining the mass flow rate at the second mass flow rate.

17. The system of claim 14, wherein the controller is configured to perform controlling, via a third control, the EGR inlet damper to maintain a pressure in the EGR circuit below a maximum pressure threshold.

18. A method of controlling a mass flow of an exhaust gas to be delivered from an exhaust gas recirculation (EGR) system to a gas turbine system, comprising:

receiving, via a controller, a first indication to increase a mass flow rate of the exhaust gas through an EGR circuit of the EGR system coupled to the gas turbine system from a first mass flow rate to a second mass flow rate, wherein the gas turbine system comprises a compressor, a combustor, and a turbine, wherein the gas turbine system is configured to combust a fuel and output the exhaust gas;

controlling, via a first control of the controller, an EGR blower of the EGR circuit in response to the first indication to increase the mass flow rate from the first mass flow rate to the second mass flow rate; and

25 controlling, via a second control of the controller, an EGR
outlet damper and the EGR blower of the EGR circuit
to decrease a power consumption of the EGR blower
while substantially maintaining the mass flow rate at
the second mass flow rate.

19. The method of claim 18, comprising controlling, via
the first control of the controller, the EGR blower to increase
the mass flow rate at least by increasing a fan speed of a fan
of the EGR blower, increasing a degree of opening of an
inlet guide vane (IGV) of the EGR blower, or a combination
thereof.

20. The method of claim 18, comprising controlling, via
the second control of the controller, the EGR outlet damper
and the EGR blower at least by:

increasing a degree of opening of the EGR outlet damper;

decreasing a fan speed of a fan of the EGR blower to
reduce the power consumption of the EGR blower; and coordinating the increasing degree of opening and the
decreasing fan speed to provide for substantially main-
taining the mass flow rate at the second mass flow rate.

\* \* \* \* \*